(12) United States Patent
Paul et al.

(10) Patent No.: US 9,164,862 B2
(45) Date of Patent: Oct. 20, 2015

(54) SYSTEM AND METHOD FOR DYNAMICALLY DETECTING STORAGE DRIVE TYPE

(71) Applicant: Dell Products, LP, Round Rock, TX (US)

(72) Inventors: Indrani Paul, Round Rock, TX (US); John S. Loffink, Raleigh, NC (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 14/041,758

(22) Filed: Sep. 30, 2013

(65) Prior Publication Data

US 2014/0032791 A1    Jan. 30, 2014

Related U.S. Application Data

(63) Continuation of application No. 12/964,466, filed on Dec. 9, 2010, now Pat. No. 8,583,847.

(51) Int. Cl.
G06F 13/00       (2006.01)
G06F 11/30       (2006.01)

(52) U.S. Cl.
CPC ............ *G06F 11/3034* (2013.01); *G06F 13/00* (2013.01)

(58) Field of Classification Search
USPC ......................................................... 710/304
See application file for complete search history.

(56) References Cited

U.S. PATENT DOCUMENTS

| | | |
|---|---|---|
| 5,371,858 A | 12/1994 | Miller et al. |
| 5,422,580 A * | 6/1995 | Mandel et al. ................... 326/30 |
| 5,550,958 A | 8/1996 | Hattori |
| 5,875,312 A | 2/1999 | Walsh et al. |
| 6,427,182 B1 | 7/2002 | Sugiura et al. |
| 6,438,640 B1 | 8/2002 | Miyamoto et al. |
| 6,546,482 B1 | 4/2003 | Magro et al. |
| 6,571,360 B1 | 5/2003 | Drogichen et al. |

(Continued)

FOREIGN PATENT DOCUMENTS

| | | |
|---|---|---|
| JP | 01052258 A | 2/1989 |
| JP | 09306087 A | 11/1997 |
| JP | 2011060407 A | 3/2011 |

OTHER PUBLICATIONS

Bruce L. Worthington, Gregory R. Ganger, Yale N. Patt, and John Wilkes. 995. On-line extraction of SCSI disk drive parameters. In Proceedings of the 1995 ACM SIGMETRICS joint international conference on Measurement and modeling of computer systems (SIGMETRICS'95/Performance '95) Blaine D. Gaither (Ed.). ACM, new York, NY, USA, 146-156.

*Primary Examiner* — Faisal M Zaman
(74) *Attorney, Agent, or Firm* — Larson Newman, LLP

(57) ABSTRACT

An information handling system includes a cable, a backplane, and a processor. The cable is connected to a storage controller of the information handling system. The backplane is configured to connect a drive to the information handling system. The processor is in communication with the cable and with the backplane. The processor is configured to detect a presence of the drive, to output a pulse in response to the detection of the presence of the drive, to determine a first storage technology of the drive in response to the output pulse, to determine a second storage technology of the storage controller, to determine whether there is a misconfiguration between the first storage technology and the second storage technology, and to generate a notification when the misconfiguration is determined.

20 Claims, 4 Drawing Sheets

(56) References Cited

U.S. PATENT DOCUMENTS

| | | |
|---|---|---|
| 6,898,076 B2 | 5/2005 | Pappalardo et al. |
| 7,231,469 B2 | 6/2007 | Hosoya et al. |
| 7,308,534 B2 | 12/2007 | Mimatsu |
| 7,484,084 B1 | 1/2009 | Ranaweera et al. |
| 7,583,495 B2 | 9/2009 | Carnavali |
| 7,958,292 B2 | 6/2011 | Sutardja |
| 8,190,818 B2 | 5/2012 | Mimatsu |
| 2002/0144191 A1* | 10/2002 | Lin ................................. 714/46 |
| 2003/0208651 A1 | 11/2003 | Wurzburg |
| 2004/0117517 A1* | 6/2004 | Beauchamp et al. ........... 710/16 |
| 2004/0177182 A1 | 9/2004 | Metevier et al. |
| 2004/0252560 A1 | 12/2004 | Hsieh |
| 2005/0182874 A1* | 8/2005 | Herz et al. ...................... 710/74 |
| 2006/0004909 A1* | 1/2006 | Takuwa et al. ................ 709/203 |
| 2006/0010458 A1* | 1/2006 | Georgis ......................... 720/600 |
| 2006/0023418 A1* | 2/2006 | Solomon et al. .............. 361/687 |
| 2006/0075155 A1* | 4/2006 | Fuller et al. ..................... 710/16 |
| 2007/0223517 A1 | 9/2007 | Warren et al. |
| 2007/0233916 A1 | 10/2007 | Seto |
| 2007/0294582 A1 | 12/2007 | Rangarajan et al. |
| 2007/0299996 A1 | 12/2007 | Guy et al. |
| 2008/0019357 A1* | 1/2008 | Martinez et al. .............. 370/368 |
| 2008/0059698 A1 | 3/2008 | Kabir et al. |
| 2008/0172571 A1* | 7/2008 | Andrews et al. ................... 714/6 |
| 2008/0195786 A1 | 8/2008 | Lee |
| 2008/0239358 A1 | 10/2008 | Uno |
| 2009/0172206 A1* | 7/2009 | Hall et al. ........................ 710/10 |
| 2009/0204758 A1 | 8/2009 | Luning |
| 2009/0210742 A1 | 8/2009 | Adarshappanavar et al. |
| 2009/0234993 A1* | 9/2009 | Kitamura ........................ 710/72 |
| 2009/0265510 A1 | 10/2009 | Walther et al. |
| 2009/0271600 A1 | 10/2009 | Joshi et al. |
| 2009/0274027 A1 | 11/2009 | Tanaka et al. |
| 2010/0157763 A1 | 6/2010 | Verbeek et al. |
| 2010/0265704 A1* | 10/2010 | Singh et al. ................... 362/234 |
| 2010/0281199 A1 | 11/2010 | Fu et al. |
| 2012/0072642 A1 | 3/2012 | Okamoto et al. |
| 2012/0102580 A1 | 4/2012 | Bealkowski |
| 2012/0151097 A1 | 6/2012 | Lambert et al. |
| 2012/0151112 A1 | 6/2012 | Paul et al. |

\* cited by examiner

SYSTEM AND METHOD FOR DYNAMICALLY DETECTING STORAGE DRIVE TYPE

CROSS REFERENCE TO RELATED APPLICATIONS

This application is a continuation of U.S. patent application Ser. No. 12/964,466, entitled "System and Method for Dynamically Detecting Storage Drive Type," filed on Dec. 9, 2010, the disclosure of which is hereby expressly incorporated by reference in its entirety.

FIELD OF THE DISCLOSURE

This disclosure generally relates to information handling systems, and more particularly relates to a system and method for dynamically detecting storage drive type.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

An information handling system such as a blade server can include a converged backplane that can support a common drive connector interface for a number of different kinds of storage drives. For example, the backplane of the blade server can connect to a serial advanced technology attachment (SATA) drive, a serial attached small computer system interface (SAS) drive, a peripheral connector interface express (PCIe) solid state drive, or the like. When a drive is inserted into a slot of the blade server, the drive can be connected to a backplane chipset or to a controller associated with the slot to provide communication between the drive and the other components of the blade server.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
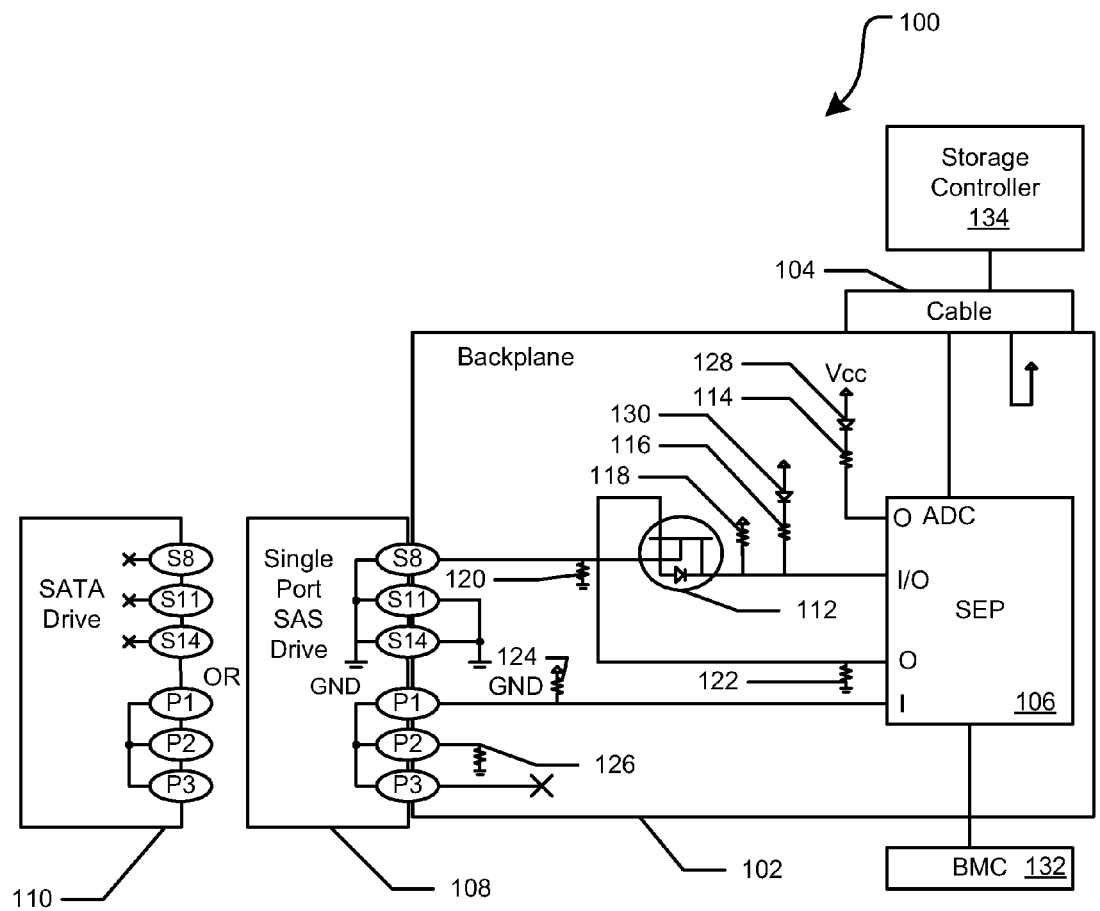
FIG. 1 is a partial block and partial schematic diagram of an information handling system.

FIG. 1 shows an information handling system 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

In a preferred embodiment, the information handling system 100 can be a server, a blade server, or the like. The information handling system 100 includes a backplane 102, a cable 104, and a storage enclosure processor (SEP) 106. The backplane 102 can connect to a number of disk drives via drive slots in the information handling system 100. The drives can operate using different storage technologies, such as an SAS drive 108, a SATA drive 110, a PCIe SSD drive, or the like. The backplane 102 includes an out-of-band drive connector interface, which in turn includes a transistor 112, resistors 114, 116, 118, 120, 122, 124, and 126, and light emitting diodes (LEDs) 128 and 130. The backplane 102 is connected to either the SAS drive 108 or to the SATA drive 110 via a number of pins such as pins S8, S11, S14, P1, P2, and P3. The cable 104 can connect the backplane 102 to a storage controller or chipset 132. The storage controller 132 can operate using the different storage technologies, such as SAS, SATA, PCIe SSD, or the like. The cable 104 includes first and second terminals. The SAS drive 108 includes pins S8, S11, and S14 that are connected together and connected to a first voltage reference GND, and pins P1, P2, and P3 that are connected together. The SATA drive 110 includes blank pins S8, S11, and S14 that are not connected within the SATA drive, and pins P1, P2, and P3 that are connected together.

The SEP 106 includes a first terminal connected to the first terminal of the cable 104, a second terminal connected to the pin P1, and third, fourth, and fifth terminals. The transistor 112 includes a first current electrode connected to the pin S8, a second current electrode connected to the fourth terminal of the SEP 106, and a control electrode connected to the third terminal of the SEP. The resistor 114 includes a first terminal, and a second terminal connected to the fifth terminal of the SEP 106. The resistor 116 includes a first terminal, and a second terminal connected to the fourth terminal of the SEP 106. The resistor 118 includes a first terminal connected to the second voltage reference, and a second terminal connected to the fourth terminal of the SEP 106.

The resistor 120 includes a first terminal connected to the first current electrode of the transistor 112, and a second terminal connected to the first voltage reference. The resistor 122 includes a first terminal connected to the third terminal of the SEP 106, and a second terminal connected to the first voltage reference. The resistor 124 includes a first terminal connected to the second voltage reference, and a second terminal connected to the second terminal of the SEP 106. The resistor 126 includes a first terminal connected to the pin P2, and a second terminal connected to the first voltage reference. The LED 128 includes a first terminal connected to the second voltage reference, and a second terminal connected to the first terminal of the resistor 114. The LED 130 includes a first terminal connected to the second voltage reference, and a second terminal connected to the fourth terminal of the SEP 106. The pins S8, S11, S14, P1, P2, and P3, the transistor 112, the resistors 114, 116, 118, 120, 122, and 124, and the LEDs 126 and 128 can be repeated for each of a number of drive slots in the information handling system 100.

During initialization of the information handling system 100 or when a drive is hot-plugged into the information handling system, the SEP 106 can detect a drive in communication with the SEP, via a signal from the pin P1 to a presence pin of the SEP. The presence pin can be the second terminal of the SEP 106. When the SEP 106 has detected the presence of a drive, the SEP can utilize the out-of-band drive connecter interface to read a storage technology of the newly detected drive. The SEP 106 can output a pulse from the third terminal of the SEP to the control electrode of the transistor 112. The pulse can activate the transistor 112, such that the transistor can connect the fourth terminal of the SEP 106 with the pin S8. In response to the transistor 112 being activated, a voltage at the fourth terminal of the SEP 106 can vary between a high voltage and a low voltage based on the drive connected to the backplane 102.

For example, if the SAS drive 108 is connected to the SEP 106, the voltage at the fourth terminal can be a low voltage and substantially equal to zero based on the pin S8 of the SAS drive being connected to the first voltage reference GND. If the SATA drive 110 is connected to the SEP 106, the voltage at the fourth terminal is not pulled to a low voltage, because the pin S8 of the SATA drive is not connected to anything within the SATA drive. Thus, the resistor 118 can pull up the voltage at the fourth terminal to the second voltage reference. Therefore, the SEP 106 can determine the storage technology for the drive based on the voltage at the fourth terminal. The SEP 106 can send the determination of drive type to a board management controller (BMC) 130 of the information handling system 100 in response to a request from the BMC.

If the SAS drive 108 is connected to the information handling system 100, the line connected to the resistor 116 can be pulled to a low voltage, via the pin S8, such that current can flow through the LED 130 to light up the LED. When the LED 130 lights up a user is provided with a visual indication that an SAS drive is connected in the slot. However, if the SATA drive 110 is connected to the information handling system 100, the line connected to the resistor 116 can be pulled to a high voltage, via the resistor 118, such that current does not flow through the LED 130 and the LED is not lit up. When the LED 130 does not light up the user can determine that a SATA drive is connected in the slot.

The SEP 106 can also detect the storage technology of the storage controller 132 connected to the cable 104, via the first terminal of the SEP. The storage technology of the storage controller 132 can be SATA, SAS, or the like. The SEP 106 can then determine whether there is a misconfiguration between the storage technology of storage controller 132 connected to the cable 104, and the storage technology of the drive connected to the backplane 102. An SAS controller connected to the cable 104 can communicate with both the SAS drive 108 and with the SATA drive 110. However, a SATA controller can only communicate with the SATA drive 110. Thus, if cable 104 is connected to a SATA controller, the SEP 106 can detect a misconfiguration between the controller and the drive if the SAS drive is connected to the information handling system 100.

The SEP 106 can be set to either pull the fifth terminal to a low voltage or to a high voltage to either light up the LED 128 or not, and to create a misconfiguration pattern in the LEDs 128 and 130 in response to the misconfiguration between the storage controller 132 and the drive. Alternatively, the SEP 106 can cause the LEDs 128 and 130 to blink in response to the misconfiguration between the storage controller 132 and the drive. The SEP 106 can connect to the BMC 134 to set a mask register in the BMC as either a valid slot or an invalid slot depending on whether there is a misconfiguration between storage controller 132 and the drive. The BMC 134 can then notify the user if there is a misconfiguration between the storage controller 132 and the drive. Thus, the user can determine whether the drive inserted into the drive slot can communicate with the information handling system 100.

Figure 2:
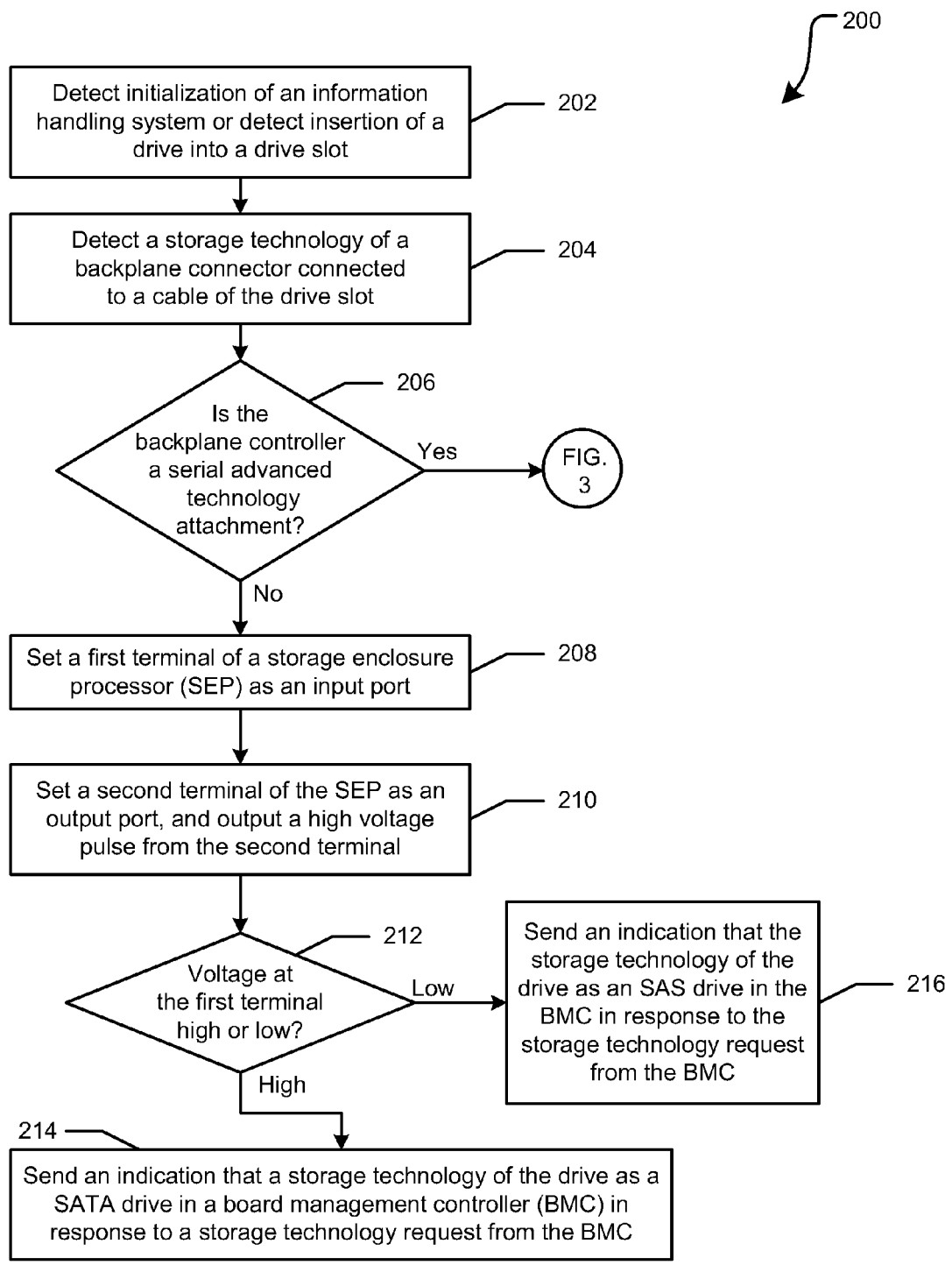
FIGS. 2 and 3 are a flow diagram of a method for detecting a storage technology of a drive connected to a backplane of the information handling system.
Figure 3:
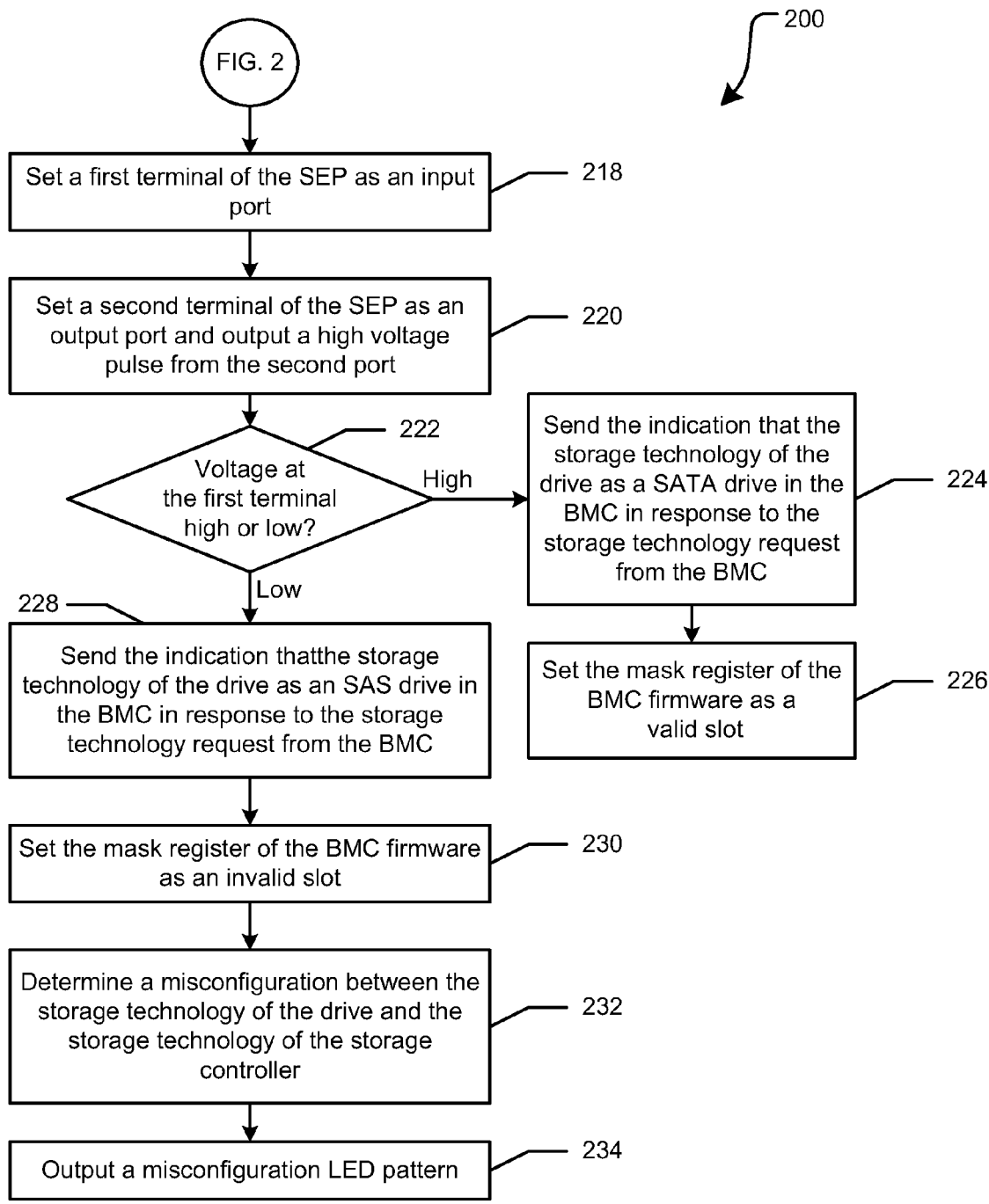

FIGS. 2 and 3 show a method 200 for detecting a storage technology of a drive connected to a backplane of an information handling system. At block 202, an initialization of the information handling system or an insertion of a drive into a drive slot of the information handling system is detected. The drive can be a SATA drive, an SAS drive, or the like. The drive can be a hot-plug drive, such that the drive can be connected to or removed from the information handling system while the information handling system is powered on with the drive without data loss in the drive. A storage technology of a storage controller connected to a cable of the drive slot is detected at block 204. The cable preferably provides the storage controller with communication to the drive inserted into the information handling system. The storage technology of the storage controller and the storage technology of the drive can be SATA, SAS, or the like. At block 206, a determination is made whether the storage technology of the storage controller is SATA. If the storage technology of the storage controller is not SATA, a first terminal of the SEP is set as an input port at block 208. At block 210, a second terminal of the SEP is set as an output port and a high voltage pulse is output from the second terminal.

A determination is made whether the voltage at the first terminal is high or low at block 212. If the voltage at the first terminal is high, an indication that a storage technology of the drive is a SATA drive is sent to a board management controller (BMC) of the information handling system in response to a storage technology request from the BMC at block 214. At block 216, if the voltage at the first terminal is low, an indication that the storage technology of the drive is an SAS drive is sent to the BMC in response to the storage technology request from the BMC.

As shown in FIG. 3, if the storage technology of the storage controller is SATA, the first terminal of the SEP is set as an input port at block 218. At block 220, the second terminal of the SEP is set as an output port and a high voltage pulse is output from the second terminal. A determination is made whether the voltage at the first terminal is high or low at block 222. If the voltage at the first terminal is low, the indication that the storage technology of the drive is a SATA drive is sent to the BMC of the information handling system in response to the storage technology request from the BMC at block 224. The mask register of the BMC firmware is set as a valid slot at block 226.

If the voltage at the first terminal is a low voltage, the indication that the storage technology of the drive is an SAS drive is sent to the BMC of the information handling system in response to the storage technology request from the BMC at block 228. The mask register of the BMC firmware is set as an invalid slot at block 230. At block 232, a misconfiguration of storage technologies between the storage technology of the storage controller and the storage technology of the drive. At block 234, a misconfiguration LED pattern is output.

Figure 4:
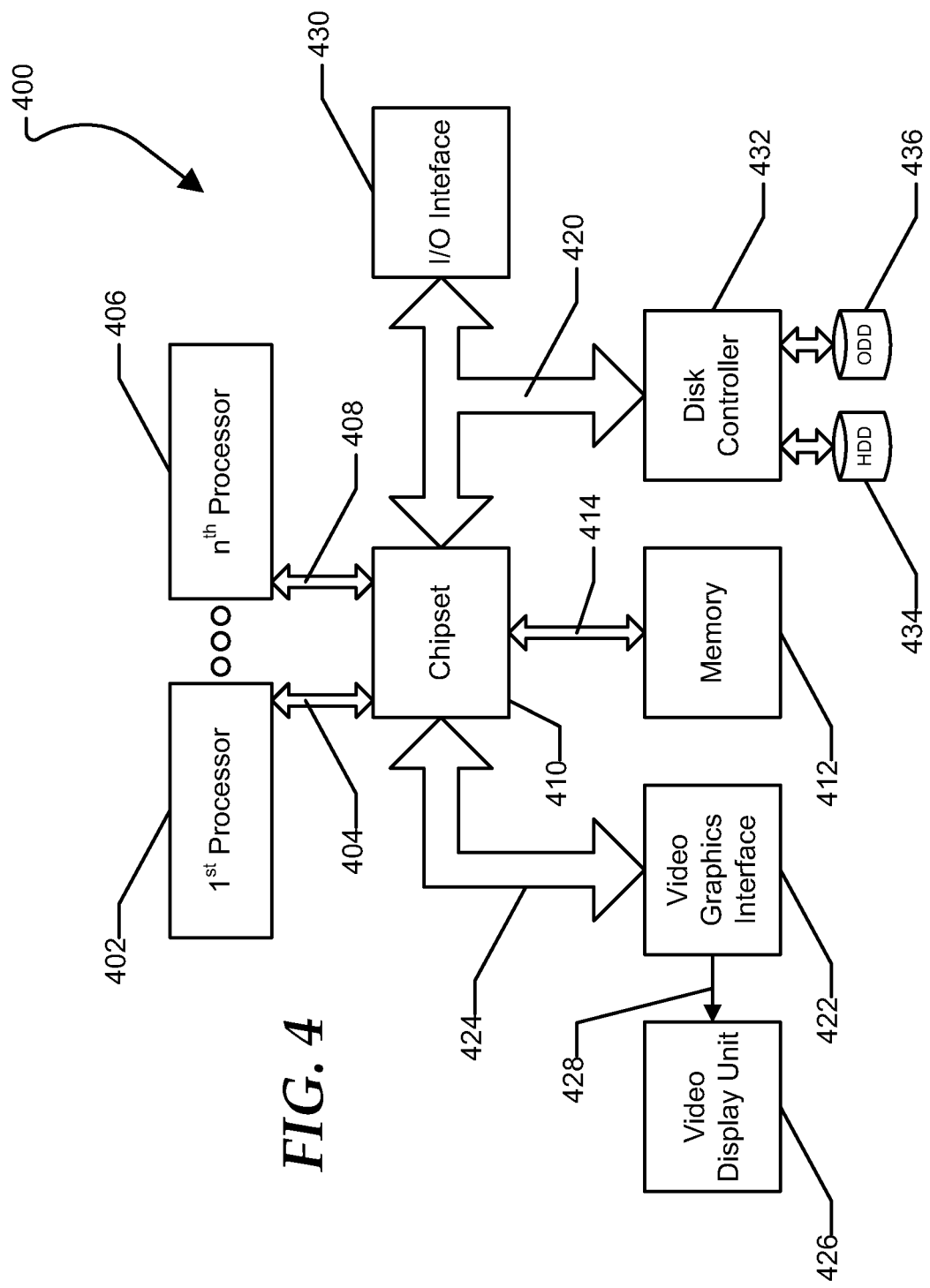
FIG. 4 is a block diagram of a general information handling system.

FIG. 4 illustrates a block diagram of a general information handling system, generally designated at 400. In one form, the information handling system 400 can be a computer system such as a server. As shown in FIG. 4, the information handling system 400 can include a first physical processor 402 coupled to a first host bus 404 and can further include additional processors generally designated as $n^{th}$ physical processor 406 coupled to a second host bus 408. The first physical processor 402 can be coupled to a chipset 410 via the first host bus 404. Further, the $n^{th}$ physical processor 406 can be coupled to the chipset 410 via the second host bus 408. The chipset 410 can support multiple processors and can allow for simultaneous processing of multiple processors and support the exchange of information within information handling system 400 during multiple processing operations.

According to one aspect, the chipset 410 can be referred to as a memory hub or a memory controller. For example, the chipset 410 can include an Accelerated Hub Architecture (AHA) that uses a dedicated bus to transfer data between first physical processor 402 and the $n^{th}$ physical processor 406. For example, the chipset 410, including an AHA enabled-chipset, can include a memory controller hub and an input/output (I/O) controller hub. As a memory controller hub, the chipset 410 can function to provide access to first physical processor 402 using first bus 404 and $n^{th}$ physical processor 406 using the second host bus 408. The chipset 410 can also provide a memory interface for accessing memory 412 using a memory bus 414. In a particular embodiment, the buses 404, 408, and 414 can be individual buses or part of the same bus. The chipset 410 can also provide bus control and can handle transfers between the buses 404, 408, and 414.

According to another aspect, the chipset 410 can be generally considered an application specific chipset that provides connectivity to various buses, and integrates other system functions. For example, the chipset 410 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 410. The chipset 410 can also be packaged as an application specific integrated circuit (ASIC).

The information handling system 400 can also include a video graphics interface 422 that can be coupled to the chipset 410 using a third host bus 424. In one form, the video graphics interface 422 can be an Accelerated Graphics Port (AGP) interface to display content within a video display unit 426. Other graphics interfaces may also be used. The video graphics interface 422 can provide a video display output 428 to the video display unit 426. The video display unit 426 can include one or more types of video displays such as a flat panel display (FPD) or other type of display device.

The information handling system 400 can also include an I/O interface 430 that can be connected via an I/O bus 420 to the chipset 410. The I/O interface 430 and I/O bus 420 can include industry standard buses or proprietary buses and respective interfaces or controllers. For example, the I/O bus 420 can also include a Peripheral Component Interconnect (PCI) bus or a high speed PCI-Express bus. In one embodiment, a PCI bus can be operated at approximately 66 MHz and a PCI-Express bus can be operated at approximately 428 MHz. PCI buses and PCI-Express buses can be provided to comply with industry standards for connecting and communicating between various PCI-enabled hardware devices. Other buses can also be provided in association with, or independent of, the I/O bus 420 including, but not limited to, industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 410 can be a chipset employing a Northbridge/Southbridge chipset configuration (not illustrated). For example, a Northbridge portion of the chipset 410 can communicate with the first physical processor 402 and can control interaction with the memory 412, the I/O bus 420 that can be operable as a PCI bus, and activities for the video graphics interface 422. The Northbridge portion can also communicate with the first physical processor 402 using first bus 404 and the second bus 408 coupled to the $n^{th}$ physical processor 406. The chipset 410 can also include a Southbridge portion (not illustrated) of the chipset 410 and can handle I/O functions of the chipset 410. The Southbridge portion can manage the basic forms of I/O such as Universal Serial Bus (USB), serial I/O, audio outputs, Integrated Drive Electronics (IDE), and ISA I/O for the information handling system 400.

The information handling system 400 can further include a disk controller 432 coupled to the I/O bus 420, and connecting one or more internal disk drives such as a hard disk drive (HDD) 434 and an optical disk drive (ODD) 436 such as a Read/Write Compact Disk (R/W CD), a Read/Write Digital Video Disk (R/W DVD), a Read/Write mini-Digital Video Disk (R/W mini-DVD), or other type of optical disk drive.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a cable connected to a storage controller of the information handling system;
   a backplane configured to connect a drive to the information handling system; and a processor in communication with the cable and with the backplane, the processor configured to detect a presence of the drive, to output a pulse from a first terminal of the processor in response to the detection of the presence of the drive, to detect a voltage at a second terminal of the processor in response to the output pulse, to set a storage technology of the drive to a first storage technology in response to a first value of the voltage at the second terminal, to set the storage technology of the drive to a second storage technology in response to a second value of the voltage at the second terminal, and to light up a light emitting diode in response to the storage technology of the drive being the first storage technology to indicate that the storage technology of the drive is the first storage technology.

2. The information handling system of claim 1 wherein the processor is further configured to determine a third storage technology of the storage controller, to determine whether there is a misconfiguration between the storage technology of the drive and the third storage technology of the storage controller.

3. The information handling system of claim 1 wherein first storage technology is detected out-of-band.

4. The information handling system of claim 1 wherein the second storage technology of the storage controller is selected from a group consisting of serial advanced technology attachment and serial attached small computer system interface.

5. The information handling system of claim 1 wherein the first storage technology of the drive is selected from a group consisting of a serial advanced technology attachment drive and a serial attached small computer system interface drive.

6. The information handling system of claim 1 wherein the presence of the drive is detected upon initialization of the information handling system.

7. The information handling system of claim 1 wherein the presence of the drive is detected upon a connection of the drive to the information handling system via a hot-plug connection.

8. An information handling system comprising:
a cable connected to a storage controller of the information handling system;
a backplane configured to connect a drive to the information handling system;
an out-of-band drive connector interface in communication the drive, the out-of-band drive connector interface configured to detect a presence of the drive; and
a processor in communication with the cable, with the backplane, and with the out-of-band drive connector interface, the processor configured to detect a presence of the drive, to output a pulse from a first terminal of the processor in response to the detection of the presence of the drive, to detect a voltage at a second terminal of the processor in response to the output pulse, to set a storage technology of the drive to a first storage technology in response to a first value of the voltage at the second terminal, to set the storage technology of the drive to a second storage technology in response to a second value of the voltage at the second terminal, and to light up a light emitting diode in response to the storage technology of the drive being the first storage technology to indicate that the storage technology of the drive is the first storage technology.

9. The information handling system of claim 8 wherein the processor is further configured to determine a third storage technology of the storage controller, to determine whether there is a misconfiguration between the storage technology of the drive and the third storage technology of the storage controller.

10. The information handling system of claim 8 wherein the second storage technology of the storage controller is selected from a group consisting of serial advanced technology attachment and serial attached small computer system interface.

11. The information handling system of claim 8 wherein the first storage technology of the drive is selected from a group consisting of a serial advanced technology attachment drive, and a serial attached small computer system interface drive.

12. The information handling system of claim 8 wherein the presence of the drive is detected upon initialization of the information handling system.

13. The information handling system of claim 8 wherein the presence of the drive is detected upon a connection of the drive to the information handling system via a hot-plug connection.

14. A method comprising:
detecting an initialization of an information handling system or an insertion of a drive into a drive slot of the information handling system;
outputting a high voltage pulse from a first terminal of a processor;
detecting a voltage at a second terminal of the processor;
setting a storage technology of the drive to a first storage technology in response to detecting a first value of the voltage at the second terminal;
setting the storage technology of the drive to a second storage technology in response to detecting a second value of the voltage at the second terminal; and
lighting up a light emitting diode in response to the storage technology of the drive being the first storage technology to indicate that the storage technology of the drive is the first storage technology.

15. The method of claim 14 further comprising:
detecting a third storage technology of a storage controller connected to a cable of the drive slot;
determining whether there is a misconfiguration between the storage technology of the drive and the third storage technology of the storage controller.

16. The method of claim 14 wherein the storage technology of the drive is selected from a group consisting of a serial advanced technology attachment drive, and a serial attached small computer system interface drive.

17. The method of claim 14 wherein the second storage technology of the storage controller is selected from a group consisting of serial advanced technology attachment and serial attached small computer system interface.

18. The method of claim 14 wherein the storage technology of the drive is determined out-of-band.

19. The method of claim 14 wherein the cable provides the storage controller with communication to the drive inserted into the information handling system.

20. The method of claim 14 wherein the drive is a hot-plug drive.

* * * * *